March 16, 1926.
N. A. CATENARO
1,576,717
BRAKE FOR MOTOR VEHICLES
Filed Dec. 19, 1924
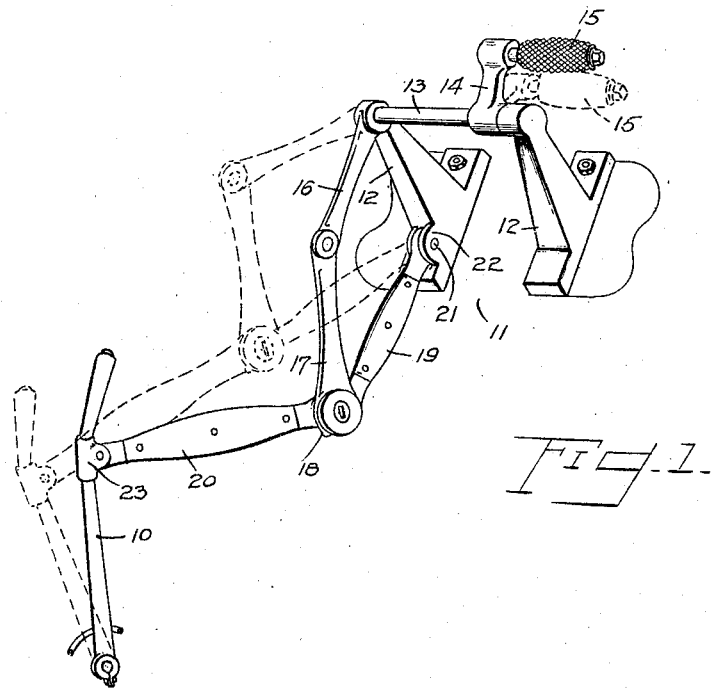
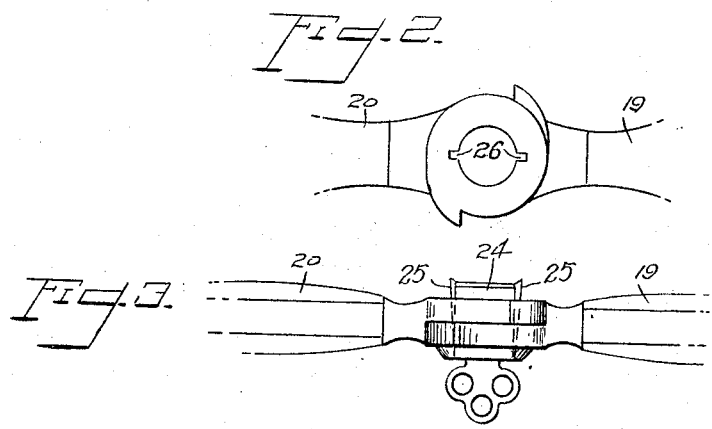
INVENTOR
NICHOLAS A. CATENARO
BY Edwin Leirsohn
ATTORNEY Patented Mar. 16, 1926.

1,576,717

UNITED STATES PATENT OFFICE.

NICHOLAS A. CATENARO, OF BROOKLYN, NEW YORK.

BRAKE FOR MOTOR VEHICLES.

Application filed December 19, 1924. Serial No. 756,937.

*To all whom it may concern:*

Be it known that I, NICHOLAS A. CATENARO, a citizen of the United States, residing at Brooklyn, New York, have invented a new and useful Improvement in Brakes for Motor Vehicles, of which the following is a specification.

My invention relates to a pedal attachment for the emergency brake lever of a motor vehicle.

During the manipulation of a motor vehicle it may often be desirable to apply both brakes simultaneously and at the same time allow both hands of the operator to be free while doing so. Such an operation may not be done where the emergency brake is only applied by means of a brake lever usually provided for the purpose. In case of an emergency one hand must be taken from the wheel and used to operate the brake lever.

With the above in mind it is the purpose of the present invention to provide a foot operated attachment for the brake lever whereby the same may be operated to apply the brake by slight pressure of the foot upon a pedal arranged on the floor of the car.

A further object of the invention is to provide a lock arrangement for the foot attachment whereby the brake lever may be locked in brake position to prevent operation of the motor by unauthorized persons.

The invention is illustratively exemplified in the accompanying drawing, in which Figure 1 is a perspective view of my improved attachment connected to the emergency brake lever of a motor car; Figure 2 is a detail view of a part of the attachment showing the locking arrangement; and Figure 3 is a plan view of the same.

Referring to the drawing, 10 denotes the emergency brake lever of a motor car, and 11 the floor plane of the car. The full line position of the lever in the drawing shows the lever released and the dotted position shows the brake lever locked.

The pedal attachment for the brake lever 10 comprises a pair of brackets 12 preferably secured to the floor 11 of the car and in the present illustration I have shown them arranged on the inclined section of the floor.

A rock shaft 13 is mounted in bearings at the upper ends of the brackets 12, and at one end of the shaft is an arm 14 having a pedal pad 15 at its free end. The pad consists of a rubber member having a roughened surface to be engaged by the foot of the operator. Adjacent the opposite end, the shaft 13 carries a lever arm 16 which is pivoted at its outer end to a second arm 17, the latter being provided with a yoke 18 at its free end. The yoke 18 embraces the pivotal connection between two link members 19 and 20, the link 19 being pivoted on a pin 21 arranged between ears 22 disposed on the base of the upright portion of the adjacent bracket 12. The other link member 20 at its outer end is pivoted in bracket clamp 23, which is disposed about the upper portion of the emergency brake lever 10.

In order to prevent the release of the brake the pivotal connection between the two links 19 and 20 is provided with a locking device 24 having two ribs 25 which are inserted in grooves 26 cut in the walls of the adjacent portions of the two links.

The attachment operates as follows: Assuming the brake lever 10 is to be operated by the attachment, the pedal 15 is depressed to rock the shaft 13 and raise the arm 14. This operation lifts the arm 17 and pivotal connection between the two links 19 and 20, the former then swings about its pivot and forces the opposite end forward, since the normal position of the pivotal connection is below a line drawn between the pivotal points on the lever 10 and bracket 12. Forward arcuate movement of the link 20 causes the lever 10 to move forward, as indicated in dotted lines in Figure 1. The brake is then in locked position and may be made to remain so by locking the locking device 24.

What I claim and desire to secure by Letters Patent is:

1. A pedal attachment for an emergency brake lever, comprising a pair of brackets, a rock shaft mounted in said brackets, a pair of links pivoted at their free ends on a bracket and the lever, respectively, and a second set of links having their free ends attached to the rock shaft and pivotal connection between the first links to lift the latter and cause the rearward movement of the lever.

2. A pedal attachment, as claimed in claim 1, including a locking device arranged in the pivotal connection to lock the links in extended position.

In testimony whereof, he has signed his name to this specification, this 16th day of December, 1924.

NICHOLAS A. CATENARO.